US008825461B2

(12) United States Patent
Sun et al.

(10) Patent No.: US 8,825,461 B2
(45) Date of Patent: Sep. 2, 2014

(54) OVERLAPPED MULTIPLE LAYER DEPTH AVERAGED FLOW MODEL OF A TURBIDITY CURRENT

(75) Inventors: Tao Sun, Missouri City, TX (US); Dachang Li, Katy, TX (US); John Van Wagoner, Houston, TX (US); Xiaohui Wu, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 595 days.

(21) Appl. No.: 13/131,799

(22) PCT Filed: Nov. 16, 2009

(86) PCT No.: PCT/US2009/064513
§ 371 (c)(1),
(2), (4) Date: May 27, 2011

(87) PCT Pub. No.: WO2010/071722
PCT Pub. Date: Jun. 24, 2010

(65) Prior Publication Data
US 2011/0240310 A1    Oct. 6, 2011

Related U.S. Application Data

(60) Provisional application No. 61/138,889, filed on Dec. 18, 2008.

(51) Int. Cl.
*G06G 7/50*      (2006.01)
*G01V 99/00*    (2009.01)
(52) U.S. Cl.
CPC ..................................... *G01V 99/00* (2013.01)
USPC .............................................................. 703/9

(58) Field of Classification Search
USPC .............................................................. 703/9
See application file for complete search history.

(56) References Cited

U.S. PATENT DOCUMENTS 5,844,799 A    12/1998  Joseph et al.
5,995,906 A    11/1999  Doyen et al.
(Continued)

FOREIGN PATENT DOCUMENTS

EP           1837683        9/2007
WO    WO 2006/036389    4/2006
(Continued)

OTHER PUBLICATIONS

Alessandro Valiani, Lorenzo Begnudelli, "Divergence Form for Bed Slope Source Term in Shallow Water Equations" Journal of Hydrolic Engineering, ISSN 0733-9429/2006/7-652-665, Jul. 2006, pp. 652-665.*

(Continued)

*Primary Examiner* — Dwin M Craig
(74) *Attorney, Agent, or Firm* — ExxonMobil Upstream Research Company, Law Dept.

(57) ABSTRACT

A method of generating a model of a turbidity current in a fluid is disclosed. A first flow layer in the turbidity current is defined. The method successively defines at least one more flow layer in the turbidity current. Each successive flow layer includes the previously defined flow layer. A set of depth-averaged flow variables for each flow layer is defined. A model is developed that describes the turbidity current. The model uses fluid flow equations and the set of depth-averaged flow variables for each flow layer to predict fluid flow in each flow layer. The model is then output.

21 Claims, 6 Drawing Sheets

(56) References Cited

U.S. PATENT DOCUMENTS

| | | | |
|---|---|---|---|
| 6,070,125 | A | 5/2000 | Murphy et al. |
| 6,246,963 | B1 | 6/2001 | Cross et al. |
| 6,498,989 | B1 | 12/2002 | Pisetski et al. |
| 6,674,432 | B2 | 1/2004 | Kennon et al. |
| 6,754,588 | B2 | 6/2004 | Cross et al. |
| 6,941,255 | B2 | 9/2005 | Kennon et al. |
| 7,006,951 | B2 | 2/2006 | Pond, Jr. et al. |
| 7,027,964 | B2 | 4/2006 | Kennon et al. |
| 7,043,367 | B2 | 5/2006 | Granjeon |
| 7,043,413 | B2 | 5/2006 | Ward et al. |
| 7,062,383 | B2 * | 6/2006 | Deffenbaugh et al. ........... 702/2 |
| 7,079,953 | B2 | 7/2006 | Thorne et al. |
| 7,117,091 | B2 | 10/2006 | Masson et al. |
| 7,123,258 | B2 | 10/2006 | Deny et al. |
| 7,149,671 | B2 | 12/2006 | Lim et al. |
| 7,260,508 | B2 | 8/2007 | Lim et al. |
| 7,282,241 | B2 | 10/2007 | Kim et al. |
| 7,292,241 | B2 | 11/2007 | Thore et al. |
| 7,337,069 | B2 | 2/2008 | Masson et al. |
| 7,340,385 | B2 | 3/2008 | James |
| 7,363,158 | B2 | 4/2008 | Stelting et al. |
| 7,369,973 | B2 | 5/2008 | Kennon et al. |
| 7,392,136 | B2 | 6/2008 | Salles et al. |
| 7,516,055 | B2 | 4/2009 | Strebelle |
| 7,617,082 | B2 | 11/2009 | Childs et al. |
| 7,630,517 | B2 | 12/2009 | Mirowski et al. |
| 2006/0041409 | A1 | 2/2006 | Strebelle et al. |
| 2007/0219725 | A1 * | 9/2007 | Sun et al. ........................ 702/13 |
| 2007/0276604 | A1 | 11/2007 | Williams et al. |
| 2008/0015784 | A1 | 1/2008 | Dorn et al. |
| 2008/0154562 | A1 | 6/2008 | Blanchette et al. |
| 2009/0164182 | A1 | 6/2009 | Pedersen et al. |
| 2009/0312995 | A1 | 12/2009 | Pyrcz et al. |

FOREIGN PATENT DOCUMENTS

| | | |
|---|---|---|
| WO | 2008/005690 | 1/2008 |
| WO | WO 2008/005690 | 1/2008 |
| WO | WO 2009/002715 | 12/2008 |
| WO | 2009/020715 | 2/2009 |
| WO | 2009/138290 | 11/2009 |
| WO | WO 2009/138290 | 11/2009 |

OTHER PUBLICATIONS

Garcia and Parker, "Entrainment of Bed Sediment Into Suspension", Journal of Hydraulic Engineering, 117, No. 4, Apr. 1991, pp. 414-435.

Huthoff, F., et al, "Analytical Solution of the Depth-Averaged Flow Velocity in Case of Submerged Rigid Cylindrical Vegetation", Jan. 1, 2006, America Geophysical Union, vol. 43, No. 6, pp. 1-11.

Khan, Sadia M., et al., "Numerical Modeling of Hyperpycnal Plume", 2005, Marine Geology, vol. 222-223, pp. 193-211.

Parker, G., Fukushima, Y., and Pantin, H. M. (1986)," Self-Accelerating Turbidity Currents", J. Fluid Mech., V171, 145-181.

Abreu V., Van Wagoner J. C., Beaubouef R., and Hoyal D. C. J. D., (2006), Scour Lobe Fundamental Depositional Element of Deepwater Distributary Systems, Presented at *2006 AAPG Annual Conference*, Apr. 9-12, Houston, TX, Abstract.

Flint, S., Hodgson, D.M., Sixsmith, P., Grecula, M.,and Wickens, H.D, (2008), Deepwater Basin floor slope deposits of the Laingsburg Depocenter,Karoo Basin, South Africa, in Nilsen,T., et al., eds., *Atlas of deepwater outcrops: American Association of Petroleum Geologists Studies in Geology* 56, p. 326-329.

Miller J., T. Sun, H. Li, J. Stewart, C. Genty, D. Li, and C. Lyttle, (2008), Direct Modeling of Reservoirs Through Forward Process-Based Models: Can We Get There?, Presented at *2008 International Petroleum Technology Conference*, paper No. 12729.

Mitchum, R.J., Jr. and Van Wagoner, J.C., (1991), high-frequency sequences and their stacking patterns: sequence-stratigraphic evidence of high-frequency eustatic cycles, *Sedimentary Geology*, v.70, p. 131-160.

Shanley, K.W. , McCabe, P.J., and Hettinger, R.D., (1992), Tidal influence in Cretaceous fluvial strta from Utah, U.S.A.—a key to sequence stratigraphic interpretation, *Sedimentology*, v.39, p. 905-930.

Shanley, K.W., and McCabe, P.J., (1994), Perspectives on the Sequence Stratigraphy of Continental Strata, *AAPG Bulletin*, v. 78, No. 4, p. 544.

Sprague, A.R.G., Patterson, P.E., Hill, R.E., Jones, C.R., Campion, K.M., Van Wagoner, J.C., Sullivan, M.D., Larue, D.K., Feldman, H.R., Demko, T.M., Wellner, R.W., and Geslin, J.K., (2002), The physical stratigraphy of fluvial strata: A hierarchical approach to the analysis of genetically related stratigraphic elements for improved reservoir prediction (abs.), *Am Assoc. Petrol. Geol., Annual Meeting*, Mar. 10-13, 2002, Houston, Texas.

Strebelle, S., (2002), Conditional simulation of complex geological structures using multiple point statistics, *Mathematic Geology*, 34(1): p. 1-22.

Vail P. R., Mitchum, R.M., Jr., Todd, R.G., Widmier, J.M. Thompson, S. III, Sangree, J.B., Bubb, J.N., and Hatfield, W.G., (1977), Seismic stratigraphy and global changes in sea level. In: C.E. Payton, ed., Seismic Stratigraphy—Applications to Hydrocarbon Exploration, *Am. Assoc. Petrol., Memoir* 26, p. 49-212.

Van Wagoner, J.C., Posamentier, H.W., Mitchum, R.M., et al., (1988), An overview of the fundamentals of sequence stratigraphy and key definitions, in Wilgus, C.K., et al., eds., Sea level changes: an integrated approach: *SEPM Special Publication* 42, p. 39-45.

Van Wagoner, J.C., R.M. Mitchum, K.M. Campion, and V.D. Rahmanian, (1990), Siliciclastic sequence stratigraphy in well logs, cores, and outcrops: Tulsa, Oklahoma, *American Association of Petroleum Geologists Methods in Exploration Series*, No. 7, p. 55.

Van Wagoner, J.C., and G.T. Bertram, eds., (1995), Sequence stratigraphy and Marine to nonmarine facies architecture of foreland basin strata, book cliffs, Utah, U.S.A., *AAPG Memoir* 64, Chapter 6, p. 137-223.

\* cited by examiner

OVERLAPPED MULTIPLE LAYER DEPTH AVERAGED FLOW MODEL OF A TURBIDITY CURRENT

CROSS-REFERENCE TO RELATED APPLICATION

This application is the National Stage of International Application No. PCT/US2009/064513, that published as WO2010/071722, filed 24 Jun. 2010 which claims the benefit of U.S. Provisional Application No. 61/138,889, filed 18 Dec. 2008. The entirety of each of these applications is incorporated herein by reference for all purposes.

FIELD OF THE INVENTION

This invention relates generally to calculating and modeling turbidity currents, and more specifically, to efficiently calculating and modeling turbidity currents with sediment mixtures of bimodal or multi-modal distributions containing a significant amount of fine materials.

BACKGROUND OF THE INVENTION

This section is intended to introduce various aspects of the art, which may be associated with embodiments of the invention. A list of references is provided at the end of this section and may be referred to hereinafter. This discussion, including the references, is believed to assist in providing a framework to facilitate a better understanding of particular aspects of the invention. Accordingly, this section should be read in this light, and not necessarily as admissions of prior art.

In the oil and gas industries, data and information about subsurface reservoirs are input into physics and process based models, which are then used to build geological models, aid reservoir interpretation and characterization, and perform multi-scenario generation and uncertainty quantification. The technique becomes especially important in oil and gas industries when reservoirs of interest are formed in a confined environment or in enclosed basin-like settings.

One characteristic of fluid flow is known as a turbidity current, which can be defined as a bottom-flowing current resulting from a fluid that has higher density because it contains suspended sediment. Turbidity currents (also referred to herein as turbidity flows) are typically intermittent, but they possess considerable erosional power and transport appreciable volumes of sediment. A turbidity current is intrinsically three dimensional. In natural turbidity currents, sediments with large particle sizes, such as sand, are mostly transported in the bottom layer of the flow while sediments with smaller particle sizes such as clay and shale are transported more uniformly across the entire flow layer. This is shown in FIG. 1, which is a side elevational view of a turbidity current 10 over a solid surface such as a riverbed 11. The boundary between turbid water and clear water, higher in the fluid flow, is shown at 12. The lower region 13 of the turbidity current can be called the sandy portion because most of the sediment transported thereby has a large particle size. The upper region 14 of the turbidity current can be called the muddy portion because most of the sediment transported thereby has a smaller particle size. The amount of sediment transported by the lower and upper regions of the turbidity current is illustrated by the superimposed sediment concentration profiles 15, 16, which represent the relative concentration of mud and sand, respectively, as a function of flow depth. The sediment concentration profiles 15, 16 are used to define the boundary 17 between the upper and lower regions 12, 13 of the turbidity current and serve as a division therebetween. This division or stratification of the types of sediment transport can be easily seen from FIG. 1. Stratification has significant impacts on the flow characteristics, the interactions between the flow and the underlying topography, as well as the shape and the spatial distributions of the deposits the flow forms. The impacts are especially strong when turbidity currents occur in a confined environment. FIG. 2 depicts a cross section of a stratified turbidity current 20 in a deep water channel 21. The main flow direction is perpendicular to and flowing outward from the drawing. As clear water from above the clear/turbid water boundary 22 is entrained or incorporated into the turbidity current below boundary 22, the overall flow thickness is often greater than the depth Z of the deep water channel 21. Consequently, the turbidity current 20 spills out of the channel, as indicated by arrows 23. Because of the stratification of the muddy portion 24 and the sandy portion 25 of the turbidity current (as again demonstrated by the respective sediment concentration profiles 26 and 27), only fine grain size materials associated with muddy portion 24 of the turbidity current are transported out of the channel, while the relative coarser materials associated with sandy portion 25 are all retained in the channel. This process is known as flow stripping. If there were no stratification, or if flow models do not or cannot account for stratification, it would be predicted that the turbidity current spilling out from the channel would contain sediment from both sandy portion 25 and muddy portion 24 of the turbidity current.

While the impact of stratification on the transport and deposition of sediments in the turbidity currents is most pronounced in a confined environment where the interactions between the flow and the surrounding boundaries are the strongest, the impact is not limited to only those settings where the flow is confined. Stratification may also cause divergence of the flow directions between the sandy portion of the flow and the overall flow if there is a substantial variation of the topography underlying the turbidity current. As shown in FIGS. 1 and 2, the sandy portion of the turbidity current is often much thinner than the total depth of the turbidity current. Therefore, the flow direction of the sandy portion is much more likely than the entire turbidity current to be affected by the contours or topography of the riverbed or seabed upon which it flows. FIG. 3 is a top view of a turbidity current 30 having a flow pattern represented by curve 31. The sandy portion of the turbidity current has a flow pattern represented by curve 32. It can be seen that sandy portion 32 will follow the bottom topography, as illustrated by a series of contour lines 34, much closer than the overall turbidity current 30. The divergence of the sandy portion of the turbidity current from the overall current means that coarse, sandy materials and fine, muddy materials in the current may be transported in different directions within the same turbidity current and may be deposited or detrained in different places as well. The reservoirs formed or influenced by such divergent turbidity currents may therefore be significantly impacted with respect to compartmentalization and/or connectivity.

Process-based models that are used to aid interpretation or build geologic models of reservoirs in the deposition settings should be capable of capturing the features of the turbidity flow, such as flow stripping and flow divergence as described herein. Unfortunately, while full 3-dimensional flow models are capable of accurately computing the full 3-dimensional structures of the flow, they are computationally formidable and expensive and are not practical for use in the process-based models that are designed to simulate the formation of reservoirs with spatial scales ranging from hundreds of meters to hundreds of kilometers, and with time scales ranging from hundreds to millions of years. On the other hand, the 2-dimensional depth-averaged flow models for turbidity currently used in known process-based models are not capable of modeling flow stripping and the divergence of the bottom flow layers from the overall depth-averaged flow. Therefore, it is believed that no existing method can capture the effect of flow stripping as well as the divergence of the bottom layer flow directions from the overall flow direction, yet still be computationally efficient enough to be used in process-based models designed for large scale and long term simulations.

The foregoing discussion of need in the art is intended to be representative rather than exhaustive. A technology addressing one or more such needs, or some other related shortcoming in the field, would benefit drilling and reservoir development planning, for example, providing decisions or plans for developing a reservoir more effectively and more profitably.

Other related material may be found in the following: PCT Application WO2006/036389; Garcia and Parker, Entrainment of bed sediment into suspension, J. Hyd. Eng., 117 (4), 414-435, 1991; and Parker, G., Fukushima, Y., and Pantin, H. M., "Self-Accelerating Turbidity Currents", J. Fluid Mech., 171, 145-181, 1986.

SUMMARY OF THE INVENTION

The invention provides a method of generating a model of a turbidity current in a fluid. A first flow layer in the turbidity current is defined. The method successively defines at least one more flow layer in the turbidity current. Each successive flow layer includes the previously defined flow layer. A set of depth-averaged flow variables for each flow layer is defined. A model is developed that describes the turbidity current. The model uses fluid flow equations and the set of depth-averaged flow variables for each flow layer to predict fluid flow in each flow layer. The model is then output.

The invention also provides a method for generating a model of a turbidity current in a fluid. First and second flow layers in the turbidity current are defined. The first and second flow layers are non-overlapping and are defined based on concentration of differently sized sediments entrained therein. A first set of depth-averaged flow variables are defined based upon characteristics of the first flow layer. A second set of depth-averaged flow variables are defined based upon characteristics of the combined first and second flow layers. A model is developed describing the turbidity current. The model uses fluid flow equations and the first and second sets of depth-averaged flow variables to predict fluid flow in each flow layer. The model is then output.

The invention further provides a method of predicting hydrocarbon production from a hydrocarbon reservoir. A fluid flow within the hydrocarbon reservoir is located. A turbidity current in the fluid flow is defined. A first flow layer in the turbidity current is defined. The method successively defines at least one more flow layer in the turbidity current. Each successive flow layer includes the previous flow layer. A set of depth-averaged flow variables is defined for each flow layer. The turbidity current is modeled using fluid flow equations and the two or more sets of depth-averaged flow variables to predict fluid flow in each flow layer. The hydrocarbon reservoir is modeled using the model of the turbidity current. Hydrocarbon production is predicted based on the model of the hydrocarbon reservoir.

BRIEF DESCRIPTION OF THE DRAWINGS

The foregoing and other advantages of the invention may become apparent upon reviewing the following detailed description and drawings of non-limiting examples of embodiments in which.

Figure 1:
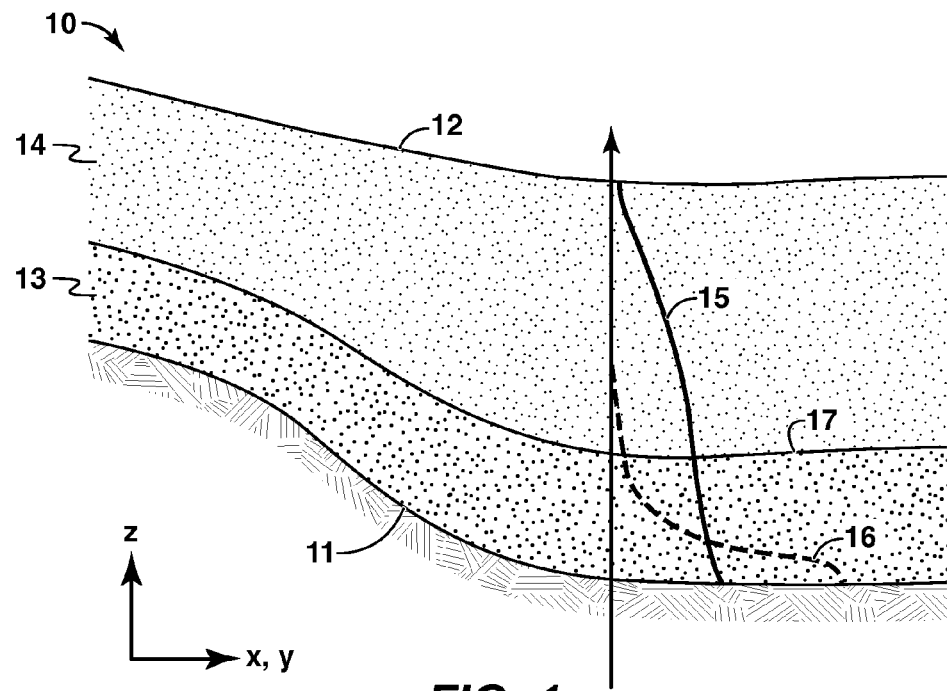
FIG. 1 is a side elevational view of concentration profiles in a turbidity current.
Figure 2:
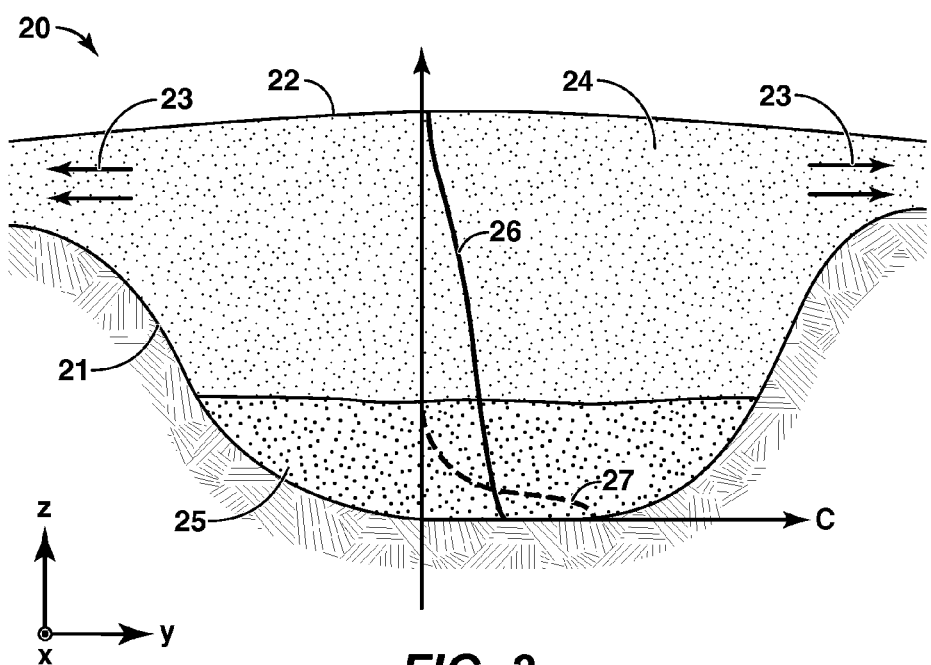
FIG. 2 is a cross-section of stratified turbidity current in a deep water channel.
Figure 3:
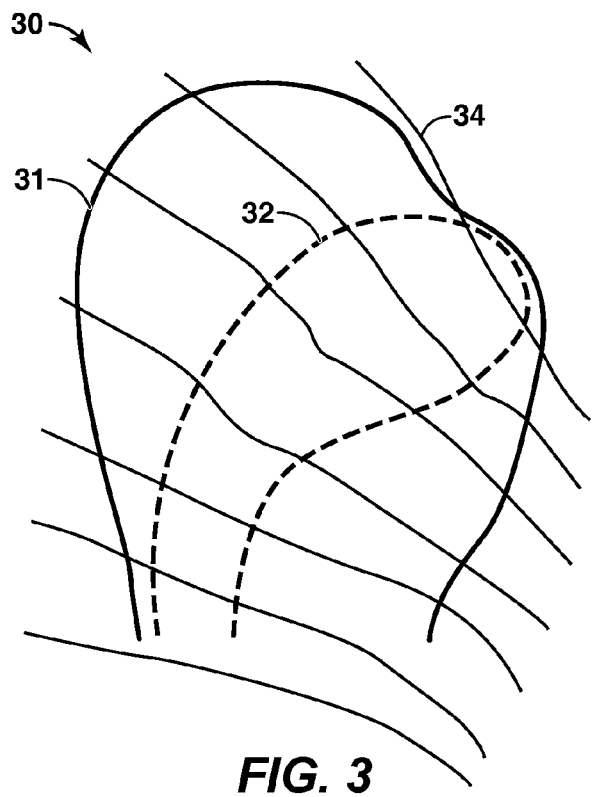
FIG. 3 is a schematic diagram showing the divergence of flow directions for the bottom part of the sandy layer of the flow from the direction of the overall flow.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

In the following detailed description section, the specific embodiments of the invention are described in connection with preferred embodiments. However, to the extent that the following description is specific to a particular embodiment or a particular use of the invention, this is intended to be for example purposes only and simply provides a description of the embodiments provided herein as representative examples of the invention. Accordingly, the invention is not limited to the specific embodiments described below, but rather, the invention includes all alternatives, modifications, and equivalents falling within the spirit and scope of the appended claims. Furthermore, all publications, patents, and patent applications mentioned in this specification are herein incorporated by reference to the same extent as if each individual publication, patent, or patent application were each specifically and individually indicated to be incorporated by reference.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

Unless specifically stated otherwise as apparent from the following discussions, terms such as "defining", "including", "developing", "using", "outputting", "predicting", "characterizing", "locating", "modeling", or the like, may refer to the action and processes of a computer system, or similar electronic computing device, that manipulates and transforms data represented as physical quantities within the computer system's registers and memories into other data similarly represented as physical quantities within the computer system memories or registers or other such information storage, transmission or display devices. These and similar terms are to be associated with the appropriate physical quantities and are merely convenient labels applied to these quantities.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A computer-readable medium includes any mechanism for storing or transmitting information in a form readable by a machine, such as a computer ('machine' and 'computer' are used interchangeably herein). As a non-limiting example, a computer-readable medium may include a computer-readable storage medium (e.g., read only memory ("ROM"), random access memory ("RAM"), magnetic disk storage media, optical storage media, flash memory devices, etc.), and a computer-readable transmission medium (such as electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

The invention is a method to represent and calculate turbidity currents with multiple overlapped layers. The method captures essential vertical flow structures found in turbidity currents that are important for accurately representing and modeling sediment transport and deposition, and subsequently the formation and evolution of sedimentary bodies and reservoir architectures. The invention is computationally efficient and can be used in applications where calculation and modeling of turbidity currents are involved. Examples of these applications include coastal engineering, environmental research and management, naval engineering, submarine warfare design and planning, construction and maintenance of undersea telecommunication cables, and the oil and gas industries.

Figure 4:
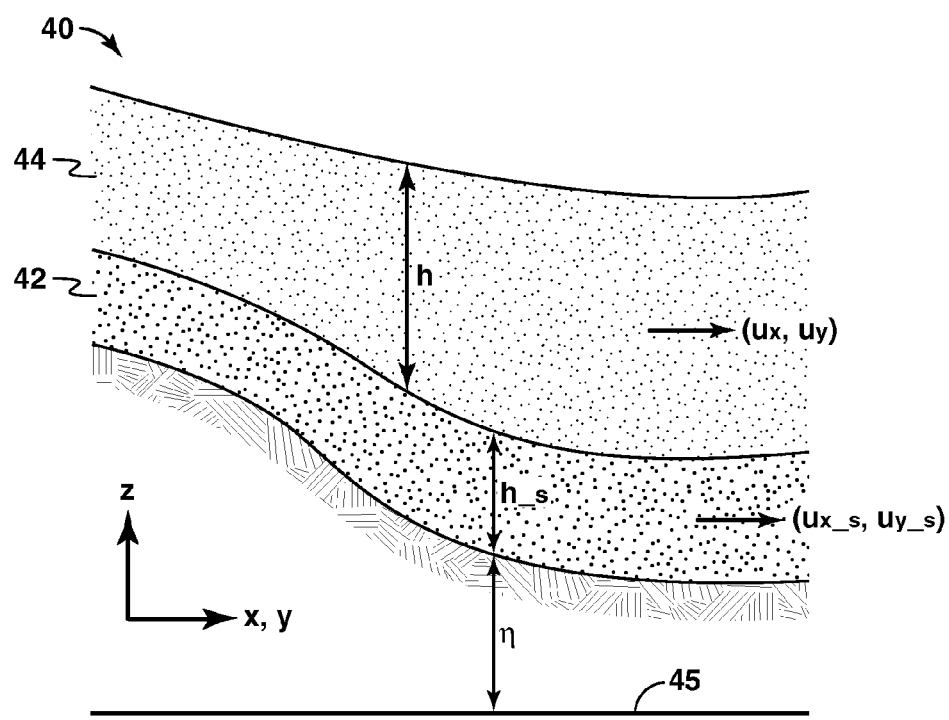
FIG. 4 is a side elevational view of a turbidity current illustrating a two-layer flow model according to the invention.

According to the invention, turbidity current is described by multiple sets of depth-averaged flow variables corresponding to multiple stratified layers in the flow. All of these layers are overlapped, in the sense that the $(n+1)^{th}$ layer always includes the $n^{th}$ layer. For example, FIG. 4 depicts a model of a turbidity current or flow 40 using a bottom layer 42 and a top layer 44. A two-layer model assumes that the turbidity flow under consideration can be described by two stratified layers. As illustrated in FIG. 4, the entire flow is characterized by two sets of depth-averaged flow variables. The first set of flow variables represent the bottom layer 42 of the flow, where all the sand is transported. The first set of flow variables include the depth $h_s$ (measured relative to a selected datum 45), the x-component of the depth-averaged flow velocity $u_{xs}$, the y-component of the depth-averaged flow velocity $u_{ys}$, the sand concentration $C_i$, with $i=1, 2, \ldots, n_s$, where $n_s$ is the discrete number of bins selected according to different grain sizes of the sand involved in the transport, with the total sand concentration $C_s$ being given by $$C_s = \sum_{i=1}^{n_s} C_i. \quad [1]$$

The second set of flow variables used to characterize the flow represent the entire flow that includes all the stratified layers, which in the example depicted in FIG. 4 would include bottom layer 42 and top layer 44. The second set of flow variables include the total flow depth h, the x-component of the depth averaged flow velocity $u_x$ for the entire flow, the y-component of the depth averaged flow velocity $u_y$ for the entire flow, the mud concentration $C_i$, with $i=n_s+1, n_s+2, \ldots, n$, where n is the total number of the bins for different sizes of both the sand and mud materials. The convention that will be used assumes that the first $n_s$ bins are for discrete sand grain sizes, and the remaining $n-n_s$ bins are for discrete mud grain sizes. Total mud concentration $C_m$ is then $$C_m = \sum_{i=n_s+1}^{n} C_i. \quad [2]$$

The model of the turbidity current, which is fully characterized by the first and second sets of flow variables as defined above, is then obtained by solving the following set of equations.

The balance of momentum equation for the x-component of the entire flow may be written as $$\frac{\partial u_x h}{\partial t} + \frac{\partial u_x^2 h}{\partial x} + \frac{\partial u_x u_y h}{\partial y} = \quad [3]$$

$$-\frac{1}{2}Rg\frac{\partial C_m}{\partial x}h^2 - RgC_m\frac{\partial h}{\partial x}h - Rg(C_m h + C_s h_s)\frac{\partial \eta}{\partial x} -$$

$$\alpha_s RgC_s\frac{\partial h_s}{\partial x} - \frac{1}{2}\alpha_s Rgh_s^2\frac{\partial C_s}{\partial x} - u^{*2}\frac{u_{xb}}{\sqrt{u_{xb}^2+u_{yb}^2}} + \Delta_x$$

The balance of momentum equation for the y-component of the entire flow may be written as $$\frac{\partial u_y h}{\partial t} + \frac{\partial u_x u_y h}{\partial x} + \frac{\partial u_y^2 h}{\partial y} = \quad [4]$$

$$-\frac{1}{2}Rg\frac{\partial C_m}{\partial y}h^2 - RgC_m\frac{\partial h}{\partial y}h - Rg(C_m h + C_s h_s)\frac{\partial \eta}{\partial y} -$$

$$\alpha_s RgC_s\frac{\partial h_s}{\partial y} - \frac{1}{2}\alpha_s Rgh_s^2\frac{\partial C_s}{\partial y} - u^{*2}\frac{u_{yb}}{\sqrt{u_{xb}^2+u_{yb}^2}} + \Delta_y$$

The conservation of mass equation for the fluid for the entire flow may be written as $$\frac{\partial h}{\partial t} + \frac{\partial u_x h}{\partial x} + \frac{\partial u_y h}{\partial y} = \varepsilon_w - \delta_w \quad [5]$$

The conservation of mass equation for the muddy materials for the entire flow may be written as $$\frac{\partial h C_i}{\partial t} + \frac{\partial h u_x C_i}{\partial x} + \frac{\partial h u_y C_i}{\partial y} = E_i - D_i \quad [6]$$

for $i = n_s+1, n_s+2, \ldots, n$

The balance of momentum equation for the x-component for the sandy layer of the flow may be written as $$\frac{\partial u_{xs} h_s}{\partial t} + \frac{\partial u_{xs}^2 h_s}{\partial x} + \frac{\partial u_{xs} u_{ys} h_s}{\partial y} = \quad [7]$$

$$-\frac{1}{2}\alpha_s Rg \frac{\partial C_s}{\partial x} h_s^2 - \alpha_s Rg C_s \frac{\partial h_s}{\partial x} h_s - Rg(C_s + C_m)\frac{\partial \eta}{\partial x} h_s -$$

$$Rg C_m \frac{\partial h}{\partial x} h_s - Rg h_s \left(h - \frac{1}{2}h_s\right)\frac{\partial C_m}{\partial x} - u^{*2}\frac{u_{xb}}{\sqrt{u_{xb}^2 + u_{yb}^2}} + \Delta_{xs}$$

The balance of momentum equation for the y-component for the sandy layer of the flow may be written as $$\frac{\partial u_{ys} h_s}{\partial t} + \frac{\partial u_{xs} u_{ys} h_s}{\partial x} + \frac{\partial u_{ys}^2 h_s}{\partial y} = \quad [8]$$

$$-\frac{1}{2}\alpha_s Rg \frac{\partial C_s}{\partial y} h_s^2 - \alpha_s Rg C_s \frac{\partial h_s}{\partial y} h_s^2 - Rg(C_s + C_m)\frac{\partial \eta}{\partial y} h_s -$$

$$Rg C_m \frac{\partial h}{\partial y} h_s - Rg h_s \left(h - \frac{1}{2}h_s\right)\frac{\partial C_m}{\partial y} - u^{*2}\frac{u_{yb}}{\sqrt{u_{xb}^2 + u_{yb}^2}} + \Delta_{ys}$$

The conservation of mass equation for the fluid (including sand particles and mud particles) for the sandy layer of the flow may be written as $$\frac{\partial h_s}{\partial t} + \frac{\partial u_{xs} h_s}{\partial x} + \frac{\partial u_{ys} h_s}{\partial y} = \varepsilon_{ws} - \delta_{ws} \quad [9]$$

The conservation of mass equation for the sandy materials may be written as $$\frac{\partial h_s C_i}{\partial t} + \frac{\partial h_s u_{xs} C_i}{\partial x} + \frac{\partial h_s u_{ys} C_i}{\partial y} = E_i - D_i \quad [10]$$

for $i = 1, 2, \ldots, n_s$

In the above equations, g is the gravitational constant, $\eta$ is the elevation of the riverbed or seabed with respect to the datum 45, and R is the submerged specific weight of the sediments where $$R = \frac{\rho_s - \rho_w}{\rho_w}$$

and $\rho_s$ and $\rho_w$ are the sediment density and water density, respectively. In equations [3], [4], [7] and [8], $\alpha_s$ is the stratification parameter which characterizes the vertical variation of sand concentration within the sandy layer of the flow. In the same equations, u* is the shear velocity for the near bed flow, which is the velocity of fluid flow adjacent the non-entrained or non-eroded floor of a reservoir, and $u_{xb}$ and $u_{yb}$ are the x and y components of the near bed flow velocity, respectively, where $$u_{xb} = \begin{cases} u_{xs} & \text{if } h_s > 0 \\ u_x & \text{if } h_s = 0. \end{cases} \quad [11]$$

Similarly, $$u_{yb} = \begin{cases} u_{ys} & \text{if } h_s > 0 \\ u_y & \text{if } h_s = 0. \end{cases} \quad [12]$$

In equation [5], $\varepsilon_w$ the entrainment function and $\delta_w$ is the detrainment function. The entrainment function characterizes the rate at which stationary clear water, above flowing turbid water, is entrained into the turbid water, thus becoming part of the flow. There are many different forms of the entrainment function. A preferred entrainment function, used by Parker et al. (1986), is $$\varepsilon_w = \frac{0.00153}{0.0204 + R_i}, \quad [13]$$

where $R_i$ is the Richardson number and equals the inverse of the square root of the well known Froude number $F_r$, namely $$R_i = \frac{1}{F_r^2}, \quad [14]$$

and $$F_r = \sqrt{\frac{u_x^2 + u_y^2}{RghC}}. \quad [15]$$

The detrainment function characterizes the settling of the sediment from the topmost part of the flow, which detrains clear water from the turbidity current and returns it back to the surrounding environment. The detrainment function is also related to the reduction of the total flow height due to the settling of the sediment from the top most part of the turbidity flow. An acceptable detrainment function, applicable to turbidity currents carrying sediments of multiple grain-sizes, is $$\delta_w = v_s(D^*), \quad [16]$$

where D* is the effective grain-size that characterizes the overall settling interface of the turbidity flow and $v_s$ is the settling velocity corresponding to $D_S^*$. The actual value of D* could range from the minimum grain-size to the geometric mean grain-size of the sediment present in the flow. An example of the possible choices for D* is $$D^* = D_{10} \quad [17]$$

where $D_{10}$ is the diameter of the 10th percentile in the sand distribution. Other detrainment functions may also be used with the invention.

Similar, but not identical to $\varepsilon_w$ and $\delta_w$, the functions $\varepsilon_{ws}$ and $\delta_{ws}$ in equation [9] are the inter-layer entrainment and inter-layer detrainment function, which characterize the rate at which the muddy layer of the water above is entrained into the moving sandy layer of the flow below, and the rate of the reduction of the sandy flow height due to the settling of the sandy materials from the top part of the sandy flow layer, respectively. The following method may be used to estimate the inter layer entrainment coefficient $e_{ws}$:

$$e_{ws} = \frac{0.00153}{0.0204 + R_{is}}, \quad [18]$$

in which $R_{is}$ is the effective Richardson number for the sandy layer of the flow, which may be evaluated from $$R_{is} = \left[\sqrt{\frac{(u_{xs} - u_x)^2 + (u_{ys} - u_y)^2 + u_{xs}^2 + u_{ys}^2 + u_x^2 + u_y^2}{2RghC_s}}\right]^{-1}. \quad [19]$$

The inter-layer entrainment rate can then be evaluated using following formula:

$$\varepsilon_{ws} = \sqrt{(u_{xs}^2 + u_{ys}^2)} e_{ws}. \quad [20]$$

Equation [14] is believed to represent an improvement over the original definition for the Richardson number using the simple depth averaged flow velocity U:

$$R_i = \left[\sqrt{\frac{U^2}{RghC_s}}\right]^{-1} \quad [21]$$

The depth-averaged flow velocity U is thus replaced with the effective shear velocity at the inter-layer boundary of the stratified layer.

The above described inter-layer entrainment model of the present invention accounts for turbulent properties of the flow when the effective inter-layer shear velocity is estimated. The formulation for the effective inter-layer shear velocity shown in equation [19] can be arrived at as follows. Let $\tilde{u}_{xs}$ and $\tilde{u}_{ys}$ denote the turbulent fluctuations of the flow velocity in the sand layer (layer 2 in FIG. 4), and $\tilde{u}_x$ and $\tilde{u}_y$ denote the turbulent fluctuations of the flow velocity in the whole layer, i.e. the background layer (layers 1 and 2 combined). From the definition of the turbulent flow, it follows that:

$$\langle u_{xs} + \tilde{u}_{xs}\rangle = u_{xs} \quad [22]$$

$$\langle u_{ys} + \tilde{u}_{ys}\rangle = u_{ys} \quad [23]$$

$$\langle u_x + \tilde{u}_x\rangle = u_x \quad [24]$$

$$\langle u_y + \tilde{u}_y\rangle = u_y \quad [25]$$

where $\langle \ \rangle$ denotes time averaging over characteristic turbulent eddy time scales.

The square of the average magnitude of the shear velocity at the boundary of the sand layer may be estimated by:

$$U^2 = \Psi\langle(u_x + \tilde{u}_x - u_{xs} - \tilde{u}_{xs})^2 + (u_y + \tilde{u}_y - u_{ys} - \tilde{u}_{ys})^2\rangle \quad [26]$$
$$= \Psi[(u_x - u_{xs})^2 + (u_y - u_{ys})^2 + \tilde{u}_x^2 + \tilde{u}_{xs}^2 + \tilde{u}_y^2 + \tilde{u}_{ys}^2]$$
$$= \Psi[(u_x - u_{xs})^2 + (u_y - u_{ys})^2 + u_x^2 + u_{xs}^2 + u_y^2 + u_{ys}^2]$$

where $\Psi$ is a constant factor to be determined. In steps shown in equation [26], the following order of magnitude approximations $$\langle \tilde{u}_x^2 \rangle \approx \langle u_x^2 \rangle = u_x^2 \quad [27]$$

$$\langle \tilde{u}_y^2 \rangle \approx \langle u_y^2 \rangle = u_y^2 \quad [28]$$

$$\langle \tilde{u}_{xs}^2 \rangle \approx \langle u_{xs}^2 \rangle = u_{xs}^2 \quad [29]$$

$$\langle \tilde{u}_{ys}^2 \rangle \approx \langle u_{ys}^2 \rangle = u_{ys}^2 \quad [30]$$

have been used.

For single layer flow, where $u_x = u_y = 0$, the square of the averaged magnitude of the shear velocity given by equation [26] is $2\Psi(u_{xs}^2 + u_{ys}^2)$ and should equal to $(u_{xs}^2 + u_{ys}^2)$ according to the classic definition for the Richardson number. Therefore it is clear that $$\Psi = \frac{1}{2} \quad [31]$$

and $$U^2 = \frac{1}{2}[(u_x - u_{xs})^2 + (u_y - u_{ys})^2 + u_x^2 + u_{xs}^2 + u_y^2 + u_{ys}^2] \quad [32]$$

which leads to the estimation of $R_{is}$ given in equation [19].

In equations [6] and [10], $E_i$ and $D_i$ are the erosion and deposition functions that characterize the rate of erosion of sediment in the $i^{th}$ grain-size bin from the bottom into the flow and the rate of deposition of sediment in the $i^{th}$ grain-size bin to the bottom from the flow, respectively. A commonly used erosion function $E_i$ expresses the rate of entrainment (or erosion) of sediment of grain-size bin i into the flow from the bed is $$E_i = \frac{a_z Z_i^5}{1 + \frac{a_z}{e_m}Z_i^5} v_{si} G_i \quad [33]$$

where $Z_i$ is a function defined as $$z_i = \lambda \frac{u^*}{v_{si}} f(R_{pi})\left(\frac{D_i}{D_{50}}\right)^{0.2} \quad [34]$$

in which $$f(R_{pi}) = \begin{cases} R_{pi}^{0.6} & \text{if } R_{pi} > 2.36 \\ 0.586 R_{pi}^{1.23} & \text{if } R_{pi} \leq 2.36 \end{cases} \quad [35]$$

and $$\lambda = 1 - 0.288\sigma. \quad [36]$$

In equation [33], $G_i$ is the volumetric percentage of the sediments of grain-size bin i in the surface layer, $a_z$ is a constant and typically has a value of $1.3 \times 10^{-7}$, $e_m$ is the maximum value of the dimensionless erosion rate $$\frac{E_i}{v_{si} G_i}$$

and it sets the upper limit of the erosion function. In equation [34], $D_{50}$ is the diameter of the sediment grain in the 50th percentile in the distribution. In equation [36], $\sigma$ is the standard deviation of the grain-size distribution in the logarithmic "phi" units familiar to geologists. Other erosion functions can be used with the invention as desired.

A deposition function $D_i$ that may be used with the invention is the deposition function for sediment in still water, expressed as $$D_i = r_0 C_i v_{si} \quad [37]$$

where $r_0$ is a model coefficient that relates the bulk sediment concentration to the near bed concentration, and $v_{si}$ is the settling velocity of the sediments in grain-size bin i.

The settling velocity function $v_s(D)$ for a sediment grain with diameter D can be specified in a number of different ways as is known in the art.

In equations [3] and [4], $\Delta_x$ and $\Delta_y$ are the rate of change (decrease) of the x and y-components of the flow momentum due to the net detrainment of the water. They may be evaluated as $$\Delta_x = (\epsilon_w - \delta_w)u_x \text{ if } \epsilon_w - \delta_w < 0.0 \quad [38]$$

$$\text{or } \Delta_x = 0 \text{ if } \epsilon_w - \delta_w > 0.0 \quad [39]$$

Similarly, $$\Delta_y = (\epsilon_w - \delta_w)u_y \text{ if } \epsilon_w - \delta_w < 0.0 \quad [40]$$

$$\text{or } \Delta_y = 0 \text{ if } \epsilon_w - \delta_w > 0.0 \quad [41]$$

Corresponding to $\Delta_x$ and $\Delta_y$ in equations [3] and [4], $\Delta_{xs}$ and $\Delta_{ys}$ in equations [7] and [8] are the rate of the change of the x and y-components of the sandy layer of the flow momentum due to the net inter-layer entrainment or inter-layer detrainment of the flow. They may be calculated from:

$$\Delta_{xs} = (\epsilon_{ws} - \delta_{ws}) u_{xs} \text{ if } \epsilon_{ws} - \delta_{ws} < 0.0 \quad [42]$$

$$\text{or } \Delta_{xs} = (\epsilon_{ws} - \delta_{ws}) u_x \text{ if } \epsilon_{ws} - \delta_{ws} > 0.0. \quad [43]$$

Similarly, $$\Delta_{ys} = (\epsilon_{ws} - \delta_{ws}) u_{ys} \text{ if } \epsilon_{ws} - \delta_{ws} < 0.0 \quad [44]$$

$$\text{or } \Delta_{ys} = (\epsilon_{ws} - \delta_{ws}) u_y \text{ if } \epsilon_{ws} - \delta_{ws} > 0.0 \quad [45]$$

In the present inventive method, not all the layers need to be present at all points along a flow path during the course of a simulation. Without loss of generality, the two-layer configuration is used below as an example of this. A turbidity current with sand and mud mixture are represented in the model by a sand layer at the bottom of the whole flow layer. As the turbidity current flows from the proximal end of the basin to the distal end of the basin, sand is deposited. At the very distal end of the basin, there could be a point beyond which no more sand is transported in the flow. From that point on, the sand layer will have zero thickness, and the model does not need to include a second layer in those locations. Thus, the model will have only one layer at those locations. On the other hand, when a fluid such as a muddy turbidity current passes over a sandy bed, the turbidity current may start to entrain sand. If the muddy turbidity current previously did not contain any sand and had no sand layer, the model will then need to initiate the sand layer to represent the newly entrained sand in the flow.

Initiation of a sand layer may be handled in the present inventive method as follows. When there is entrainment of sand from a sandy bed into a flow that does not previously contain any sand, a sandy layer is created in the flow to represent the newly added sand portion in the flow. The initial depth $\Delta h$, initial flow velocity $u_{xs}$, $u_{ys}$ of the newly created sand layer, and the associated sand concentration in the new sand layer $C_i$, for $i=1, 2, 3, \ldots, n_s$ may be given by $$\Delta h = \begin{cases} 0, & \text{if } e_{max}\sqrt{u_x^2 + u_y^2} - \delta_{ws} < 0 \quad [46] \\ \Delta t(e_{max}\sqrt{u_x^2 + u_y^2} - \delta_{ws}), & \text{if } \Delta t(e_{max}\sqrt{u_x^2 + u_y^2} - \delta_{ws}) \leq h_m \text{ and} \\ & e_{max}\sqrt{u_x^2 + u_y^2} - \delta_{ws} \geq 0 \quad [47] \\ h_m, & \text{if } \Delta t(e_{max}\sqrt{u_x^2 + u_y^2} - \delta_{ws}) > h_m \text{ and} \\ & e_{max}\sqrt{u_x^2 + u_y^2} - \delta_{ws} \geq 0 \quad [48] \end{cases}$$

$$u_{xs} = u_x, \quad [49]$$

$$u_{ys} = u_y, \quad [50]$$

and $$C_i = \begin{cases} \dfrac{E_i}{e_{max}\sqrt{u_x^2 + u_y^2} - \delta_{ws}} & \text{if } \dfrac{E_i}{e_{max}\sqrt{u_x^2 + u_y^2} - \delta_{ws}} \leq C_{iM} \text{ for } i=1, 2, \ldots, n_s \quad [51] \\ C_{iM} & \text{if } \dfrac{E_i}{e_{max}\sqrt{u_x^2 + u_y^2} - \delta_{ws}} > C_{iM} \text{ for } i=1, 2, \ldots, n_s \quad [52] \end{cases}$$

and $$C_s = \sum_{i=1}^{n_s} C_i \quad [53]$$

where the parameters $h_m$, $C_{iM}$ and $e_{max}$ may be defined by $$h_m = \frac{1}{R g C_{sM}} \left[ 0.00153 \frac{u_x^2 + u_y^2}{\delta_{ws}} - 0.0204\sqrt{u_x^2 + u_y^2} \right]^2 \quad [54]$$

$$C_{iM} = \frac{E_i}{r_0 v_{si}} \text{ for } i=1, 2, \ldots, n_s \quad [55]$$

and $$e_{max} = \frac{0.00153}{0.0204 + R_i} \bigg|_{R_i = 0} = \frac{0.00153}{0.0204}. \quad [56]$$

In equation [54], $$C_{sM} = \sum_{i=1}^{n_s} C_{iM} \quad [57]$$

In equation [54], $h_m$ is obtained based on the consideration that $$\frac{0.00153}{0.0204 + R_i(h - h_m, C = C_{sM})} \sqrt{u_x^2 + u_y^2} \geq \delta_{ws} \quad [58]$$

for the newly formed the sandy layer.

As previously explained, different erosion and resuspension models can be used with the invention. The near bed shear velocity u* used in erosion and re-suspension models may be evaluated using the layer-averaged velocity corresponding to the most bottom layer existing in that location. For example, in the two-layer configuration, if there is a sand layer at the location, the shear velocity u* may then be calculated as $$u^* = C_f^{1/2} \sqrt{u_{sx}^2 + u_{sy}^2}. \quad [59]$$

If there is no sand layer at the location, the shear velocity u* may then be evaluated as $$u^* = C_f^{1/2} \sqrt{u_x^2 + u_y^2}. \quad [60]$$

An alternative way to calculate u* is to link it to the layer-averaged turbulent kinetic energy in each different flow layers, that is K and $K_s$ in the two-layer configuration. In that case, K is the turbulent kinetic energy averaged over the entire flow layer and $K_s$ is that averaged over the sand layer. If there is a sand layer at the location, the shear velocity u* will then be calculated as $$u^* = \alpha K_s,  \quad [61]$$

or if there is no sand layer at the location, the shear velocity u* will then be evaluated as $$u^* = \alpha K. \quad [62]$$

In the above equations, the turbulent kinetic energy K and $K_s$ can be obtained by simultaneously solving the layer-averaged turbulent kinetic energy conservation equations shown below with the other governing equations among equations [3] to [10]. The conservation of the turbulent kinetic energy for the sand layer may be expressed as $$\frac{\partial K_s h_s}{\partial t} + \frac{\partial u_{xs} K_s h_s}{\partial x} + \frac{\partial u_{ys} K_s h_s}{\partial y} = \quad [63]$$

$$u^{*2} \frac{u_{xb}}{\sqrt{u_{xb}^2 + u_{yb}^2}} u_{xs} + u^{*2} \frac{u_{yb}}{\sqrt{u_{xb}^2 + u_{yb}^2}} u_{ys} - \Delta_{xs} u_{xs} - \Delta_{ys} u_{ys} +$$

$$\Delta_{Es} + \frac{1}{2}(u_{xs}^2 + u_{ys}^2)(\varepsilon_{ws} - \delta_{ws}) - \beta_K K_s^{3/2} - 2\alpha_s RGH_s \sum_{i=1}^{n_s} v_{si} C_{si} -$$

$$\alpha_s RgC_s h_s \sqrt{u_{xs}^2 + u_{ys}^2} (\varepsilon_{ws} - \delta_{ws}) - \alpha_s Rgh_s \sum_{i=1}^{n_s} v_{si}(E_i - r_0 C_{si})$$

and for the entire layer is given by $$\frac{\partial Kh}{\partial t} + \frac{\partial u_x Kh}{\partial x} + \frac{\partial u_y Kh}{\partial y} = u^{*2} \frac{u_{xb}}{\sqrt{u_{xb}^2 + u_{yb}^2}} u_x + \quad [64]$$

$$u^{*2} \frac{u_{yb}}{\sqrt{u_{xb}^2 + u_{yb}^2}} u_y - \Delta_x u_x - \Delta_y u_y + \frac{1}{2}(u_x^2 + u_y^2)(\varepsilon_w - \delta) -$$

$$\Delta_{xs} u_{xs} - \Delta_{ys} u_{ys} + \Delta_{Es} + \frac{1}{2}(u_{xs}^2 + u_{ys}^2)(\varepsilon_{ws} - \delta_{ws}) -$$

$$\beta_K K^{3/2} - Rgh \sum_{i=n_s+1}^{n} v_{si} C_{Mi} - \frac{1}{2} RgC_M h \sqrt{u_x^2 + u_y^2} \, \varepsilon_w -$$

$$\frac{1}{2} Rgh \sum_{i=n_s+1}^{n} v_{si}(E_i - r_0 C_{Mi}) - 2\alpha_s Rgh_s \sum_{i=1}^{n_s} v_{si} C_{si} -$$

$$\alpha_s RgC_s h_s \sqrt{u_{xs}^2 + u_{ys}^2} (\varepsilon_{ws} - \delta_{ws}) - \alpha_s Rgh_s \sum_{i=1}^{n_s} v_{si}(E_i - r_0 C_{si})$$

In equation [63], $$\Delta_{Es} = \frac{1}{2}(\varepsilon_{ws} - \delta_{ws})(u_x^2 + u_y^2) \text{ if } \varepsilon_{ws} \geq \delta_{ws} \quad [65]$$

$$\Delta_{Es} = \frac{1}{2}(\varepsilon_{ws} - \delta_{ws})(u_{xs}^2 + u_{ys}^2) \text{ if } \varepsilon_{ws} < \delta_{ws}. \quad [66]$$

Figure 5:
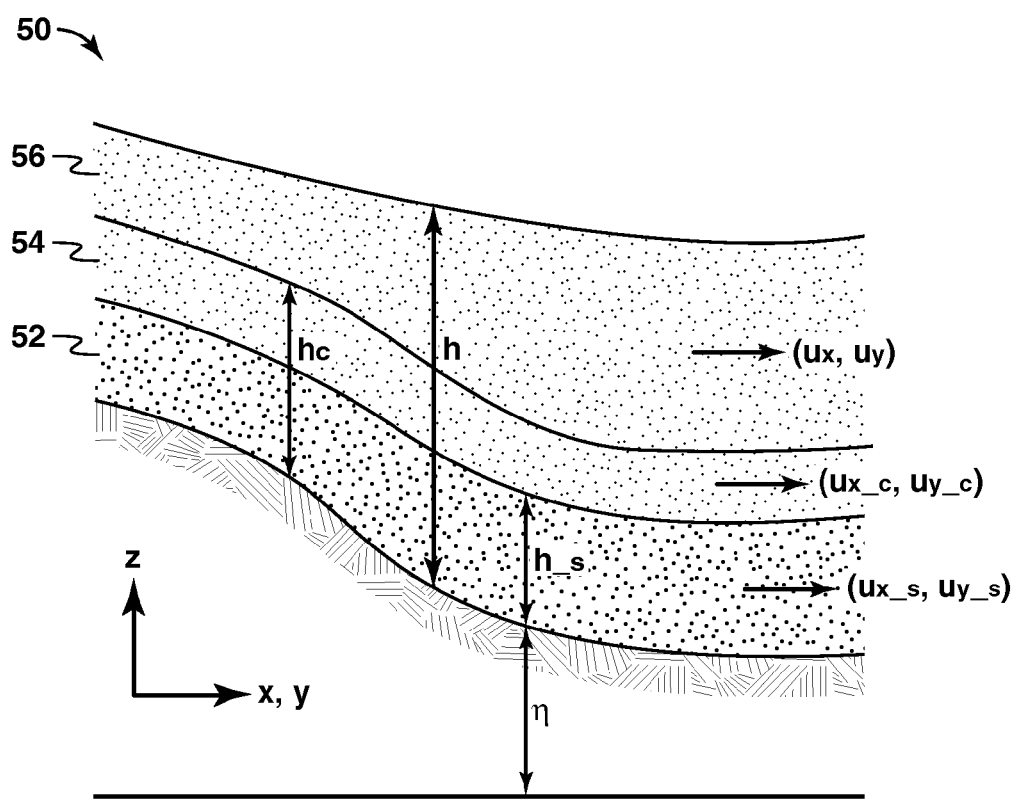
FIG. 5 is a side elevational view illustrating a three-layer flow model according to the invention.

The equations and relationships disclosed herein have been used to create a two layer model for turbidity flow. Models employing more than two layers are within the scope of the invention. For example, FIG. 5 schematically depicts a turbidity current that is subdivided into three stratified layers 52, 54, and 56. The bottom layer 52 represents the portion of the current carrying coarse sediments having a relatively large diameter, and the middle layer 54 represents the portion of the current carrying sediments having a somewhat smaller diameter. The top layer 56 represents the portion of the current carrying sediments having an even smaller diameter. The turbidity current may then be analyzed by solving for the flow variables for the bottom layer 52. Next, the flow variables for the bottom layer 52, combined with the middle layer 54, are computed. Lastly, the flow variables for the combined bottom layer 52, middle layer 54, and top layer 56 are analyzed. Using the concepts contained herein, the derivation of the flow equations for three or more layers is considered to be within the ordinary skill in the art.

The computation of flow variables for various stratified layers has been disclosed as beginning from the bottom-most layer and working upward. The invention may also solve for the flow variables by beginning at the topmost layer of the turbidity current. For example, the three-layer turbidity flow model shown in FIG. 5 may be analyzed first by solving for the flow variables relating to the top layer 56. Next, the flow variables relating to the combined top and middle layers 56, 54 are analyzed. Lastly, the flow variables relating to the combined top, middle, and bottom layers 56, 54, and 52 are analyzed.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Figure 6:
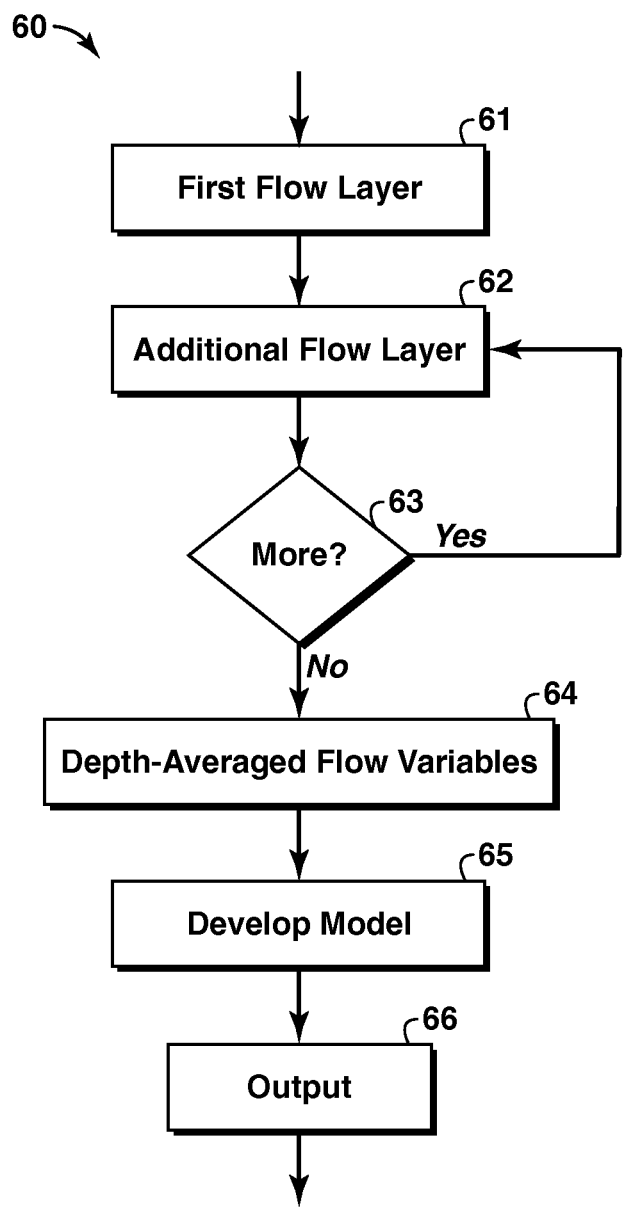
FIG. 6 is a flowchart showing a method according to the invention.

FIG. 6 is a flowchart showing a method 60 for generating a model of a turbidity current according to the invention. The turbidity current may be defined as part of a current or past fluid flow in a hydrocarbon reservoir for which optimal hydrocarbon extraction parameters are desired to be obtained. At block 61 a first flow layer in the turbidity current is defined. The first flow layer may be defined as the flow layer where substantially all large sediment, such as sand, is entrained. At block 62 an additional flow layer is defined. The additional flow layer may be defined as being larger than the first flow layer and including the first flow layer. At block 63 it is determined whether more flow layers are to be defined. If yes, the method repeats blocks 62 and 63 until all flow layers have been defined. The last flow layer to be defined is the entire turbidity current. At block 64 a set of depth-averaged flow variables are defined for each flow layer. According to the invention, the depth-averaged flow variables may include the depth of each flow layer, orthogonal horizontal components (i.e., the x and y directions of flow as defined in FIGS. 4 and 5) of the depth-averaged flow velocity for each flow layer, the distribution by size of large size sediments (such as sand) in the first flow layer, and the distribution by size of smaller sediments (such as mud) in the other flow layers. At block 65 a model describing the turbidity current is developed using the set of depth-averaged flow variables for each flow layer, as well as fluid flow equations. The fluid flow equations may include, but are not limited to the following: a conservation of mass equation for fluid flow in the first flow layer, a conservation of mass equation for fluid flow in all flow layers, a conservation of mass equation for sediment transported by the first flow layer, a conservation of mass equation for sediment transported by all flow layers, balance of momentum equations for orthogonal horizontal components of combined fluid flow in all flow layers, balance of momentum equations for orthogonal horizontal components of fluid flow in the first layer, conservation of turbulent kinetic energy for the first layer, and conservation of turbulent kinetic energy for the combined first and second flow layers. Examples of these fluid flow equations are provided herein. At block 66 the model describing the turbidity current is output. The model may be output to other geologic models predicting the behavior of a flow to which the turbidity current belongs. The model may also be iterated to predict turbidity effects over hundreds, thousands, or even millions of years. Such models and predictions may be used to predict the structure and/or performance of a subsurface hydrocarbon reservoir to optimize hydrocarbon extraction there from.

Figure 7:
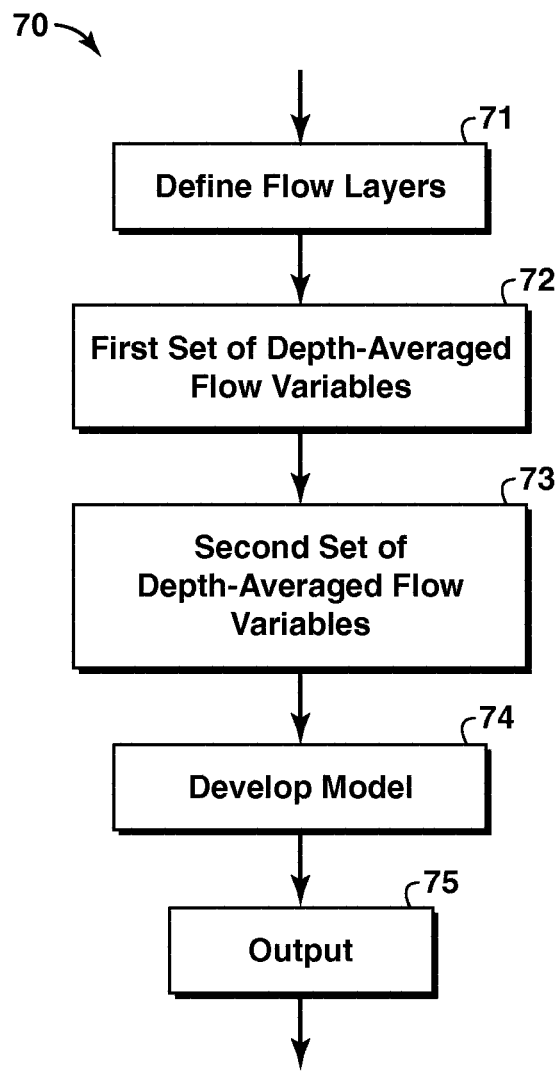
FIG. 7 is a flowchart showing another method according to the invention.

FIG. 7 is a flowchart showing another method 70 for generating a model of a turbidity current according to the invention. At block 71 a plurality of non-overlapping flow layers in the turbidity current are defined. For the purpose of explaining the flowchart the plurality will equal two. The flow layers may be defined based on the concentration of differently sized sediments entrained in the flow layers. For example, the first flow layer may be defined as the flow layer where substantially all large sediment, such as sand, is entrained. At block 72 a first set of depth-averaged flow variables are defined based upon characteristics of the first flow layer. At block 73 a second set of depth-averaged flow variables are defined based on the characteristics of the combined first and second flow layers, which together define the entire turbidity current. At block 74 a model describing the turbidity current is developed, wherein the model uses fluid flow equations and the first and second sets of depth-averaged flow variables to predict fluid flow in each flow layer. At block 75 the model describing the turbidity current is output as previously described.

Figure 8:
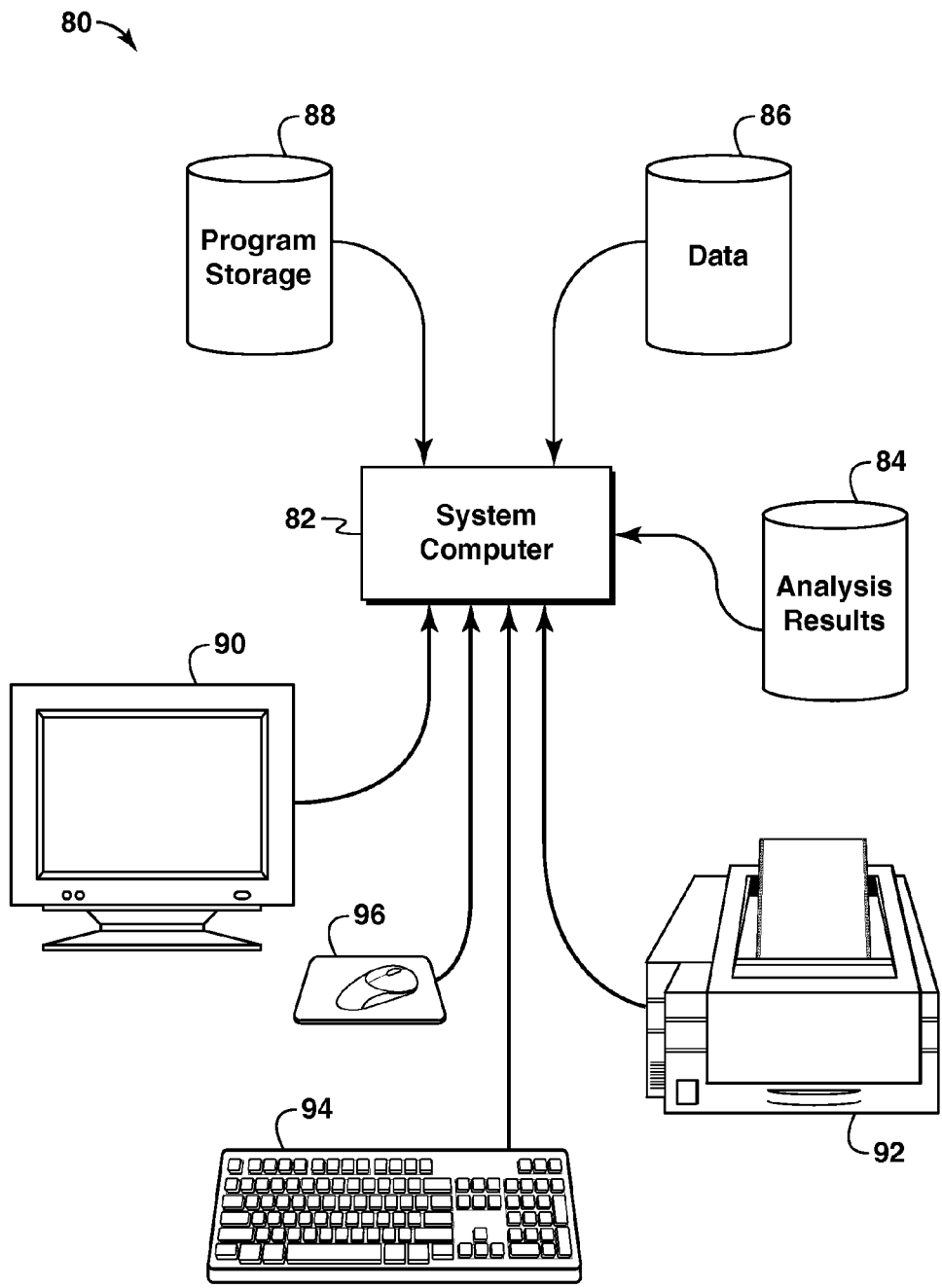
FIG. 8 is a block diagram showing a computing environment according to the invention.

FIG. 8 depicts a block diagram of a computing environment 80 that may implement one or more of the disclosed methods according to the invention. Computing environment 80 includes a system computer 82, which may be implemented as any conventional personal computer or workstation, such as a UNIX-based workstation. The system computer 82 is in communication with disk storage devices 84, 86, and 88, each of which may be any known type of computer-readable storage media such as external hard disk storage devices that are either directly connected to the system computer or accessed using a local area network or by remote access. Although disk storage devices 84, 86, and 88 are illustrated as separate devices, a single disk storage device may be used to store any and all of the program instructions, measurement data, and results as desired.

In one embodiment, the input data are stored in disk storage device 86. The system computer 82 may retrieve the appropriate data from the disk storage device 86 to perform the model development and reservoir performance prediction according to program instructions that correspond to the methods described herein. The program instructions may be written in a computer programming language, such as C++, Java and the like. The program instructions may be stored in a computer-readable memory, such as program disk storage device 88. System computer 82 presents output primarily onto a text/graphics display 90, or alternatively to a printer 92. The system computer 82 may store the results of the methods described above on disk storage 84, for later use and further analysis. A keyboard 94 and a pointing device (e.g., a mouse, trackball, or the like) 96 may be provided with the system computer 82 to enable interactive operation. The system computer 82 may be located at a data center remote from the reservoir. Additionally, while the description above is in the context of computer-executable instructions that may run on one or more computers, those skilled in the art will recognize that the subject matter as claimed also can be implemented in combination with other program modules and/or as a combination of hardware and software.

Experience indicates that the present inventive method for calculation of flow in a turbidity current using multiple layers takes only about twice as much computational effort as the conventional simple depth averaged model. In contrast to the conventional one-layer depth-averaged model, the inventive method can capture the important three-dimensional features of turbidity currents that are essential for simulations of the formation and evolution of sedimentary bodies, especially in confined settings. Specifically, modeling the full movement and behavior of a turbidity current permit a model to incorporate the effects of flow stripping and flow divergence caused by the complex nature of the turbidity current.

While the invention may be susceptible to various modifications and alternative forms, the embodiments discussed above have been shown only by way of example. The invention is not intended to be limited to the particular embodiments disclosed herein. The invention includes all alternatives, modifications, and equivalents falling within the spirit and scope of the appended claims.

What is claimed is:

1. A computer implemented method comprising:
defining a first flow layer in a turbidity current;
successively defining at least one more flow layer in the turbidity current, each successive flow layer including the previously defined flow layer;
defining a set of depth-averaged flow variables for each flow layer;
developing a model in a computer describing the turbidity current, wherein the model uses fluid flow equations and the set of depth-averaged flow variables for each flow layer to predict fluid flow in each flow layer; and
outputting the model.

2. The method of claim 1, wherein the turbidity current transports sediment having first and second non-contiguous size ranges, and wherein the first flow layer is a bottom layer containing substantially all of the sediment of the first size range, and further wherein the at least one more flow layer is a second layer defined as the entire turbidity current.

3. The method of claim 2, wherein the depth-averaged flow variables include at least one of a depth of each flow layer, orthogonal components of depth-averaged flow velocity for each flow layer, a distribution by size of the sediments of the first size range in the first flow layer, and a distribution by size of the sediments of the second size range in the second flow layer.

4. The method of claim 1, wherein the fluid flow equations include at least one of
a conservation of mass equation for fluid flow in the first flow layer,
a conservation of mass equation for fluid flow in all flow layers,
a conservation of mass equation for sediment transported by the first flow layer, and
a conservation of mass equation for sediment transported by all flow layers.

5. The method of claim 1, wherein the fluid flow equations include at least one of
 a balance of momentum equation for a first directional component of combined fluid flow in all flow layers,
 a balance of momentum equation for a second directional component of combined fluid flow in all flow layers, the second directional component being substantially orthogonal to the first directional component,
 a balance of momentum equation for the first directional component of fluid flow in the first layer, and
 a balance of momentum equation for the second directional component for fluid flow in the first layer.

6. The method of claim 1, further comprising:
 defining a first location and a second location along the turbidity current; and
 developing the model describing the turbidity current at each of the first and second locations using fluid flow equations and the depth-averaged flow variables for each flow layer.

7. The method of claim 6, wherein a depth of the first flow layer is zero at one of the first and second locations, and wherein the depth of the first flow layer is greater than zero at the other of the first and second locations.

8. The method of claim 1, wherein the model includes an inter-layer entrainment rate function for each interface between flow layers, the inter-layer entrainment function characterizing a rate at which fluid in one of the flow layers is entrained into an adjacent flow layer, the model further including an inter-layer detrainment function for each interface between flow layers, wherein the inter-layer detrainment function characterizes a rate at which fluid in the first flow layer is detrained from one of the flow layers into an adjacent flow layer.

9. A computer implemented method comprising:
 defining a first flow layer and a second flow layer in a turbidity current, the first and second flow layers being non-overlapping and defined based on concentration of differently sized sediments entrained therein;
 defining a first set of depth-averaged flow variables based upon characteristics of the first flow layer;
 defining a second set of depth-averaged flow variables based upon characteristics of the combined first and second flow layers;
 developing a model in a computer describing the turbidity current, wherein the model uses fluid flow equations and the first and second sets of depth-averaged flow variables to predict fluid flow in each flow layer; and
 outputting the model.

10. The method of claim 9, further comprising:
 defining a third flow layer in the turbidity current based on concentration of differently sized sediments, the third flow layer being non-overlapping with the first and second flow layers;
 defining a third set of depth-averaged flow variables based upon characteristics of the combined first, second and third flow layers; and
 characterizing the turbidity current using the first, second and third sets of depth-averaged flow variables;
 wherein the model uses fluid flow equations and the first, second and third sets of depth-averaged flow variables to predict fluid flow in each flow layer.

11. The method of claim 9, wherein the model includes an inter-layer entrainment rate function that characterizes a rate at which fluid above the first flow layer is entrained into the first flow layer, the model further including an inter-layer detrainment function characterizing a rate at which fluid in the first flow layer is detrained from the first flow layer.

12. The method of claim 9, wherein the first flow layer is defined as the portion of the turbidity current transporting substantially all sediment having a size that is larger than other sediment in the turbidity current.

13. The method of claim 9, wherein the depth-averaged flow variables include at least one of a depth of each flow layer, orthogonal components of a depth-averaged flow velocity for each flow layer, a distribution by size of the sediments of a first size range in the first flow layer, and a distribution by size of the sediments of a second size range in the second flow layer.

14. The method of claim 9, wherein the fluid flow equations include at least one of
 a conservation of mass equation for fluid flow in the first flow layer,
 a conservation of mass equation for fluid flow in the first flow layer combined with the second flow layer,
 a conservation of mass equation for sediment transported by the first flow layer, and
 a conservation of mass equation for sediment transported by the flow layer combined with the second flow layer.

15. The method of claim 9, wherein the fluid flow equations include at least one of
 a balance of momentum equation for a first directional component of fluid flow the first flow layer combined with the second flow layer,
 a balance of momentum equation for a second directional component of fluid flow in the first flow layer combined with the second flow layer, the second directional component being substantially orthogonal to the first directional component,
 a balance of momentum equation for the first directional component of fluid flow in the first flow layer, and
 a balance of momentum equation for the second directional component of fluid flow in the first flow layer.

16. The method of claim 9, wherein the fluid flow equations include at least one of
 conservation of turbulent kinetic energy for the first flow layer, and
 conservation of turbulent kinetic energy for the combined first and second flow layers.

17. The method of claim 9, further comprising:
 defining a first location and a second location along the turbidity current; and
 developing the model describing the turbidity current at each of the first and second locations using fluid flow equations and the depth-averaged flow variables for each flow layer.

18. The method of claim 17, wherein a depth of the first flow layer is zero at one of the first and second locations, and wherein the depth of the first flow layer is greater than zero at the other of the first and second locations.

19. A computer implemented method comprising:
 defining a turbidity current in a fluid flow within a hydrocarbon reservoir;
 defining a first flow layer in the turbidity current;
 successively defining at least one more flow layer in the turbidity current, each successive flow layer including the previous flow layer;
 defining a set of depth-averaged flow variables for each flow layer;
 modeling in a computer the turbidity current using fluid flow equations and the two or more sets of depth-averaged flow variables to predict fluid flow in each flow layer;
 modeling in a computer the hydrocarbon reservoir using the model of the turbidity current; and predicting hydrocarbon production based on the model of the hydrocarbon reservoir.

20. The method of claim 19, further comprising extracting hydrocarbons from the hydrocarbon reservoir based on the prediction of hydrocarbon production.

21. A computer program product having computer executable logic recorded on a non-transitory tangible computer readable medium, the computer program product comprising:

code for defining a first flow layer in the turbidity current;

code for successively defining at least one more flow layer in the turbidity current, each successive flow layer including the previously defined flow layer;

code for defining a set of depth-averaged flow variables for each flow layer; and code for developing a model describing the turbidity current, wherein the model uses fluid flow equations and the set of depth averaged flow variables for each flow layer to predict fluid flow in each flow layer.

* * * * *